May 1, 1923.
O. MITCHELL
FOUNTAIN PEN
Filed May 27, 1922
1,453,596
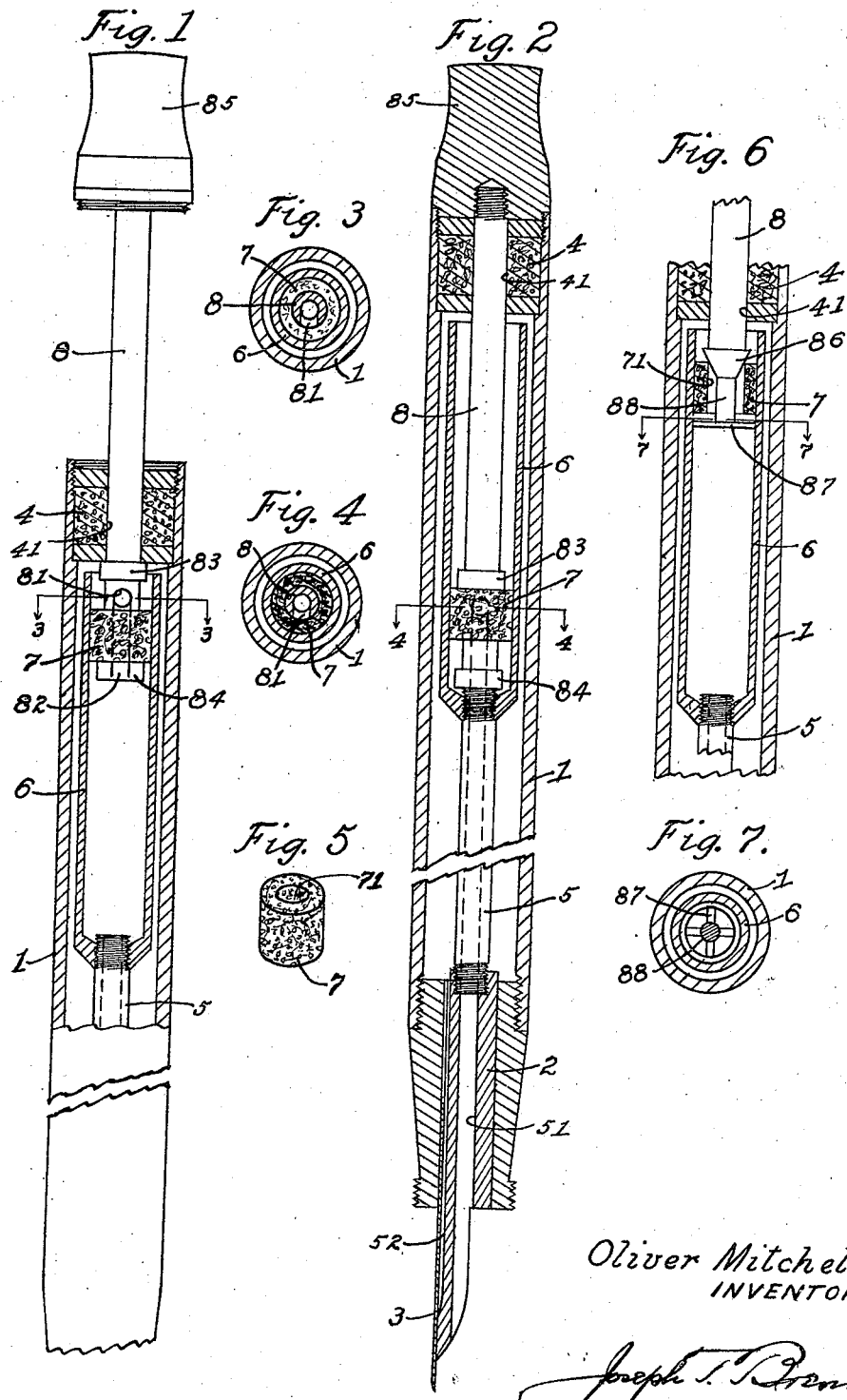
Oliver Mitchell
INVENTOR
Joseph T. Brennan
ATTORNEY Patented May 1, 1923.

1,453,596

UNITED STATES PATENT OFFICE.

OLIVER MITCHELL, OF BROOKLINE, MASSACHUSETTS.

FOUNTAIN PEN.

Application filed May 27, 1922. Serial No. 564,123.

*To all whom it may concern:*

Be it known that I, OLIVER MITCHELL, a citizen of the United States, residing at Brookline, in the county of Norfolk and State of Massachusetts, have invented certain new and useful Improvements in Fountain Pens, of which the following is a specification.

My invention is an improvement in (so-called) self-filling fountain pens.

In the drawings:

Figure 1 is a longitudinal sectional elevation of the upper end of a pen embodying my improvements, showing the piston at the upper or rear end of its stroke;

Figure 2 is a longitudinal sectional elevation of a pen embodying my improvement, showing the piston at the other end of its stroke;

Figure 3 is a cross-section on line 3—3 of Fig. 1;

Figure 4 is a cross-section on line 4—4 of Fig. 2;

Figure 5 is a perspective of the disk 7;

Figure 6 shows an alternative valve construction;

Figure 7 is a section on line 7—7 of Fig. 6.

As shown in the drawings, 1 is a fountain carrying at one end an ink feed bar, 2, supporting in proper position a pen, 3, as is customary, and at the other end a gland, 4, having a central perforation 41. Within the barrel, and mounted longitudinally and preferably axially thereof, is a pipe 5, communicating with an aperture 51, passing through the feed bar 2, to the air. Mounted at the upper end of the pipe 5, and preferably supported thereby, as shown, is a cylinder 6, the interior of the pipe and cylinder communicating. Mounted within the cylinder 6, is a disk 7, of cork or the like, frictionally fitting the interior of the cylinder. The disk 7, has an aperture, 71 therethrough, through which passes one end of a hollow ended rod, 8, which also passes through the perforation 41 in gland 4. This hollow end of rod, 8, has a side aperture, 81, and its free end, is open at 82. The rod 8 is also provided with two stops, 83 and 84, above and below the disk 7, respectively and, at its outer end equipped with a suitable finger piece 85.

The operation is as follows: The parts being assembled and positioned as in Fig. 1, it is apparent that the interior of the fountain, 1, is in communication with the interior of the cylinder 6, beneath the disk 7, through the apertures 81 and 82 of the rod 8 which passes through aperture 71 in disk 7. The disk is frictionally engaged with the interior of the cylinder 6, and upon preliminary inward movement of the rod 8 from the position shown in Fig. 1, the disk will remain stationary, the rod 8 moving through the disk until stop 83 contacts with the upper surface of the disk 7, the aperture 81 being carried within the disk and closed by this movement of rod 8.

Further movement of rod 8 will carry disk 7 to the position shown in Fig. 2, expelling all air in the cylinder 6, through pipe 5 and aperture 51, in the feed bar, air passing into cylinder 6 at the upper end from the fountain 1, behind the disk 7, thus attenuating the air in fountain 1 and causing an influx of air through the ink feed fissure 52, or, if the lower end of the fountain is submerged in ink, causing an inflow of ink through ink feed fissure 52. Upon a reversal of the movement of rod 8, the preliminary movement of the rod 8 from the position shown in Fig. 2, the disk frictionally engaging the walls of cylinder 6, will remain stationary, the rod 8 moving through the disk until stop 84 contacts with the under surface of the disk 7, the aperture 81 being carried above the upper surface of the disk and opened by this relative movement of rod and disk, thus opening communication from above the disk to below the disk through the aperture 81, hollow end of rod 8 and aperture 82. Further movement of rod back to the position shown in Fig. 1, will cause air above the disk to shift through the passage through the disk, to the interior of the cylinder, below the disk. The cycle of operation will then be repeated.

In Figures 6 and 7 I show an alternative valve construction, in which the rod 8 is not hollow at its end but is provided with a conical member 86, which on forward movement of rod 8 closes the aperture 71 in disk 7, and upon rearward movement of rod 8, opens aperture 71, the movement of the rod bringing a spider, 87, against the surface of disk 7 to carry it to the open end of the cylinder. The effect is that on the forward movement of rod 8 the disk is closed to the passage of air and pushes all air trapped in the cylinder through pipe 5. On rearward movement of the rod 8 the aperture 71 is open for the free passage of air from one side of the disk to the other, the spider offering no resistance to air passage. The forward end, 88, of rod 8 between the conical member 86 and spider 87, is of reduced size and does not fill aperture 71.

During the above described operation of expelling air no expelling pressure is put upon the contents of the fountain, but upon the contrary, during the operation the air in the fountain is attenuated. During the upward movement of the rod 8 the disk valve compresses no air above it and attenuates no air beneath it, since the air passage through the disk renders the disk inoperative as a compressing element when the passage is open.

It will be observed that the stroke of the pumping element is, comparatively to the length of the barrel, short, and that the pump is effective pro tanto, even when the stroke is not fully completed in either direction the result being that a series of short strokes moves the same volume of air that would be moved by a single long stroke in a long cylinder, thus, through the use of a pipe, to guide and contain the expelled air; the ink capacity of the pen is greatly increased.

I claim:

1. In a fountain pen, a fountain, carrying a feed bar and a pen at its front end; a gland closing the rear end of the fountain; a pipe, within the fountain and arranged longitudinally thereof, opening without the fountain at the front end; a cylinder closed at the front end, mounted upon the rear end of the pipe, the pipe and interior of the cylinder being in communication, through the closed end of the cylinder; the cylinder having an opening at its rear end; a rod hollow at its front end, passing through the gland and into the rear end of the cylinder; its inner hollow end opening into the cylinder and having a side aperture; a pair of stops mounted upon the rod; a disk, mounted upon the rod between the stops and frictionally engaging the inner walls of the cylinder, all organized as described, to cause the air passage through the rod to be alternately opened and closed by the reciprocation of the rod, as and for the purpose described.

2. In a fountain pen, a fountain, carrying a feed bar and a pen at its front end; a gland, closing the rear end of the fountain; a pipe, within the fountain and arranged longitudinally thereof, opening without the fountain at the front end; a cylinder closed at the front end, mounted upon the rear end of the pipe, the pipe and interior of the cylinder being in communication, through the closed end of the cylinder; the cylinder having an opening at its rear end; a rod, passing through the gland and into the rear end of the cylinder; a valve-piston actuated by the rod, within the cylinder and frictionally engaging the inner walls of the cylinder, all organized to cause an air passage through the valve piston to be alternately opened and closed by the reciprocation of the rod, as and for the purpose described.

3. In a fountain pen, the combination with the fountain and feed bar, of an air pipe mounted longitudinally within the fountain and opening at its front end through the feed bar to the air and communicating at its rear end through the closed front end of a cylinder, with the interior of the cylinder; that cylinder having an opening at its rear end to the interior of the fountain; a gland in the rear end of the fountain; an actuating rod passing through the gland and into the interior of the cylinder; a valve-piston within the cylinder, and actuated by the rod.

4. In a fountain pen, the combination with the fountain, of a cylinder, within the fountain, and having an opening at one end to the interior of the fountain and at the other end an opening to the atmosphere; a gland in the rear end of the fountain; an actuating rod passing through the gland and into the interior of the cylinder; a valve-piston within the cylinder and actuated by the rod.

Signed at Boston, Massachusetts, this 26th day of May, 1922.

OLIVER MITCHELL.